No. 747,733. PATENTED DEC. 22, 1903.
H. C. LAFFERTY.
COUPLING FOR AIR PIPES.
APPLICATION FILED SEPT. 24, 1903.
NO MODEL.
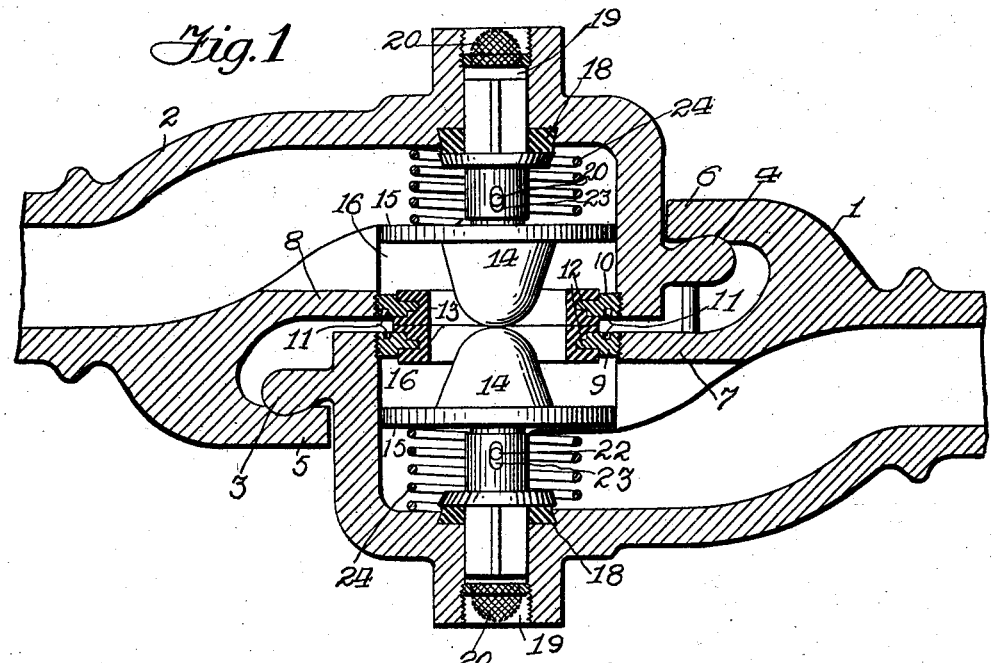
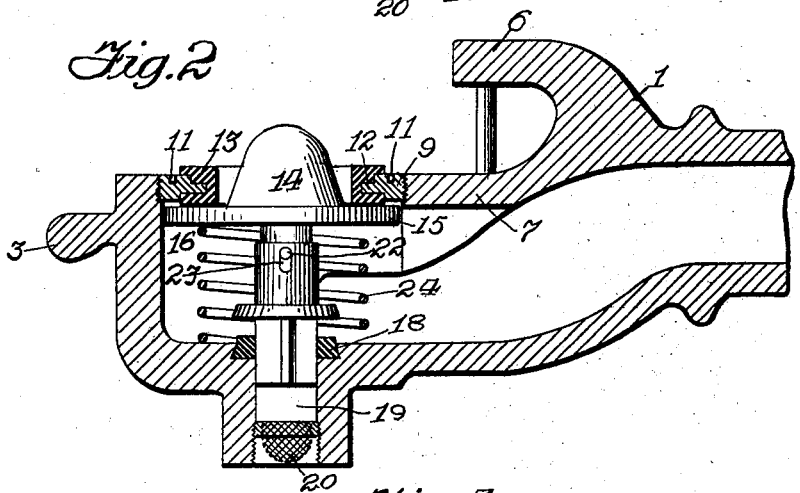
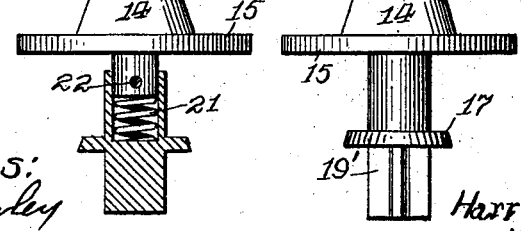
Witnesses:
Geo. B. Rowley
E. E. Potter
Inventor:
Harry C. Lafferty.
By H. C. Evert
Attorneys.

No. 747,733. Patented December 22, 1903.

UNITED STATES PATENT OFFICE.

HARRY C. LAFFERTY, OF ALLEGHENY, PENNSYLVANIA.

COUPLING FOR AIR-PIPES.

SPECIFICATION forming part of Letters Patent No. 747,733, dated December 22, 1903.

Application filed September 24, 1903. Serial No. 174,395. (No model.)

*To all whom it may concern:*

Be it known that I, HARRY C. LAFFERTY, a citizen of the United States of America, residing at Allegheny, in the county of Allegheny and State of Pennsylvania, have invented certain new and useful Improvements in Couplings for Air-Pipes, of which the following is a specification, reference being had therein to the accompanying drawings.

This invention relates to certain new and useful improvements in couplings for air-pipes; and the primary object thereof is to provide novel means for closing the communicating openings of the respective coupling-sections when the same occupy the uncoupled position and, further, to simultaneously permit the air in the train-pipes to exhaust.

A further object is to provide the communicating openings of the coupler-sections with gaskets of novel construction, which serve the double function of forming a tight joint between the sections and providing seats for the valves operating in conjunction therewith.

A still further object of my invention consists in so constructing the valve-stems as to form a means for preventing lateral movement of the valves and at the same time form practical auxiliary valves which normally close the ports which automatically open simultaneously with the closing of the main ports of the sections.

Further objects and advantages will be referred to in the following description and those features which I claim to be novel specifically defined in the appended claim.

In describing the invention in detail reference is had to the accompanying drawings, forming a part of this application, and wherein like numerals of reference will be employed to designate like parts throughout the several views, in which—

Figure 1 is a fragmentary view in longitudinal section of the coupler, the sections occupying the coupled position. Fig. 2 is a similar view of one of the coupler-sections detached. Fig. 3 is a detail view, partly in section, of one of the valves. Fig. 4 is a modified form of the same.

1 and 2 indicate the sections comprising the coupler, the general contour thereof being similar to those in use at the present time and which, as will be obvious, are provided at the inner ends of the interlocking portions with projecting tongues 3 and 4, which coöperate with the flanges 5 and 6 for preventing the accidental displacement of the sections. By this construction the sections are provided with parallel walls 7 and 8, which are provided with alining screw-threaded openings for the reception of the metal rings 9 10, the same being externally threaded, and thus removably seated in said openings. These rings are preferably inserted into position by the employment of the ordinary spanner-wrench, the same engaging the openings 11 in the ordinary manner. The interior of these rings are provided with stepped shoulders 12, which project into grooves formed in the periphery of the resilient rings or gaskets 13, whereby the latter are firmly held in position, and, as will be obvious by reference to Figs. 1 and 2, the upper and lower faces of these gaskets project beyond the corresponding faces of the metallic rings, so as to provide seats at their inner faces for the valves 14 and at their outer faces coöperating portions, the same contacting with one another when the couplers are in the coupled position. This construction permits of the formation of resilient valve-seats, which when coacting as heretofore stated form air-tight joints.

The valves 14 have their outer ends curved so that when the couplers are forced together there will be no abrupt engagement, and the operation of unseating the valves will be thus easily accomplished.

15 indicates annular heads or flanges which engage in the cylindrical portions 16 of the sections and which when the couplers are in the uncoupled position engage or seat upon the inner faces of the gaskets 13. The valve-stems of these valves in the modified construction are preferably formed integral and at a point adjacent their inner ends are formed with collars 17, which serve the function of auxiliary valves for engagement with the resilient valve-seats 18, surrounding the exhaust-ports 19. The stems at points beyond these auxiliary valves 17 are cut away to form spiders 19', which when the stems occupy the position shown in Fig. 2 will not only guide the first referred to valves, but also permit of the exhaust of any air remaining in the train-pipes.

As the primary object of this invention is to prevent the ingress of foreign substance, I provide additional means for accomplishing this result, the same being in the form of foraminous caps 20, which are threaded in the ports 19.

The valve-seats 18, which are in the form of gaskets, have their exterior tapered, so that the same when sprung into the recesses provided therefor in the sections will have a wedging action, or, in other words, tightly wedge in their recesses.

The preferred form of the main valves 14 is illustrated in Fig. 3, and in this construction I form each valve-stem in two sections, one partly telescoping within the other and being normally forced apart or held in an expanded position by the spring 21. The movement of these sections is limited by the pin 22, that projects through the inner of the two sections and the slots 23 of the outer section. This construction permits of an easier unseating of the valves than the form shown in Fig. 4; but it will be obvious that either form when employed as heretofore described is practical and capable of the functions assigned to it.

In operation when the two sections are brought together the valves 14, contacting with one another, will be unseated, and thus permit of the uninterrupted passage for the air through the sections, and as these valves are unseated the valves 17 will be simultaneously seated to close the exhaust-ports 19. When the couplers are detached or separated, the valves 14 will be seated by the springs 24, and during this movement the auxiliary valves will be open, so as to permit the air in the train-pipes to exhaust.

While I have herein shown and described a practical embodiment of my invention, yet it will be obvious that various slight changes may be made in the details of construction without departing from the general spirit of my invention.

Having fully described my invention, what I claim as new, and desire to secure by Letters Patent, is—

A coupler comprising two sections formed with alining openings, a gasket carried by each of the sections extending in said openings and having their outer faces in engagement with each other, a valve arranged in each of said sections, the opposite faces of said gasket forming seats for said valves, auxiliary valves carried by the stems of the first-named valves, with ports arranged in alinement with said openings, said auxiliary valve closing said ports, and foraminous caps at the outer ends of said ports.

In testimony whereof I affix my signature in the presence of two witnesses.

HARRY C. LAFFERTY.

Witnesses:
   H. C. EVERT,
   A. M. WILSON.